April 16, 1963
W. E. TOLLES
3,085,566
APPARATUS FOR MEASURING THE ELECTRICAL
RESPONSE OF LIVING TISSUE
Filed Sept. 18, 1959
2 Sheets-Sheet 1
FIG. 1
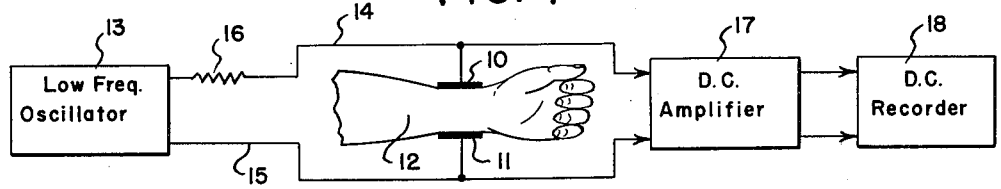
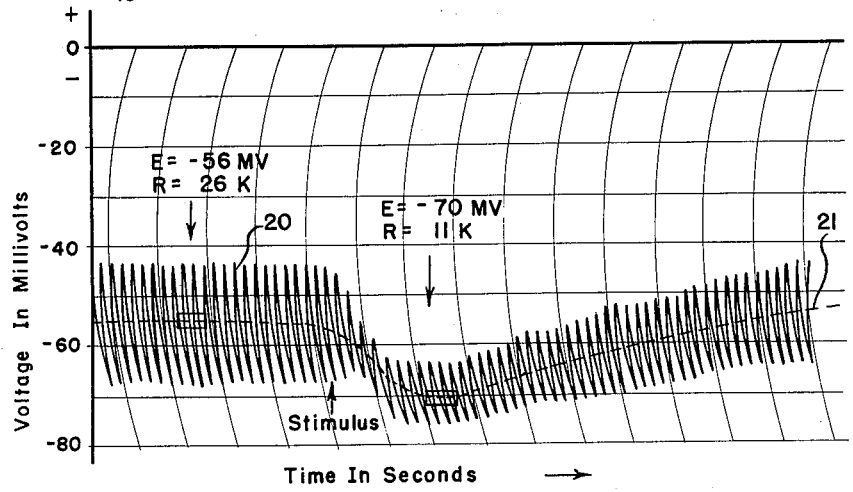
FIG. 2
FIG. 3
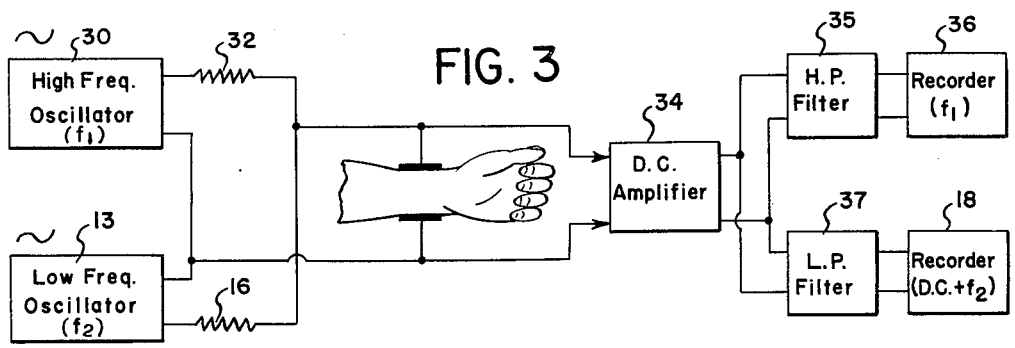
FIG. 4
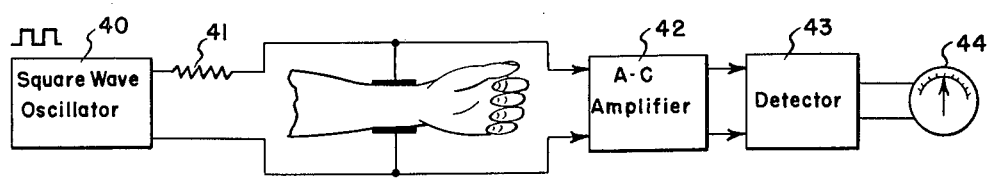
INVENTOR
Walter E. Tolles
BY
ATTORNEYS INVENTOR
Walter E. Tolles
BY
ATTORNEYS

United States Patent Office 3,085,566
Patented Apr. 16, 1963

3,085,566
APPARATUS FOR MEASURING THE ELECTRICAL RESPONSE OF LIVING TISSUE
Walter E. Tolles, Oyster Bay, N.Y., assignor to Cutler-Hammer, Inc., Milwaukee, Wis., a corporation of Delaware
Filed Sept. 18, 1959, Ser. No. 840,837
12 Claims. (Cl. 128—2.1)

This invention relates in general to improved apparatus for measuring the electrical response of biological tissue, and more particularly to apparatus for measuring tissue resistance and capacitance independently of tissue potential.

The term "galvanic skin response" has been used in the prior art to describe a variety of electrical changes in the properties of the skin induced by changes in the emotional or physiological state of an individual. Workers in the bioelectrical field have recognized that changes in both skin resistance and skin potential can be induced by an emotional or physical stress stimulus (e.g. fear, pain, anger, etc.) It is also recognized that the tissue potential may be either positive or negative in polarity and that a change in the potential induced by a stimulus may be either positive or negative. At the same time the skin resistance may either increase or decrease when the individual is subjected to the stimulus.

Psychologists and psychiatrists have been keenly interested in measuring the transient changes in tissue response to provide an objective measurement of emotional response (e.g. lie detectors, etc.), as well as steady state values. This requires apparatus capable of giving continuous indications of tissue response. Preferably the apparatus should be simple to use, and should yield direct indications without requiring manual adjustments to measure the responses as they change.

Unfortunately conventional approaches employed in the prior art for measuring variations in skin resistance have often led to erroneous and inconsistent results. For example, where a conventional ohmmeter is employed to measure the tissue resistance a known D.-C. voltage with low internal resistance is applied across the tissue resistance and the resulting current is measured to provide a measure of resistance. Since living tissue also generates a potential, this will either add to or subtract from the test voltage source and hence introduce an error in the resistance measurement. The Wheatstone bridge, commonly used for this measurement, is also subject to the same defect. As a consequence, prior art measurements of variations in skin resistance have corresponded to the combined effects of skin resistance and skin potential, and the two responses have not been separated.

It is a principal object of this invention to provide apparatus for accurately measuring skin resistance independently of skin potential.

It is also known that there are tissue capacitance effects, or more generally impedance effects, although measurement thereof is not common. It is a further object of the invention to provide convenient means for measuring such effects, thereby facilitating correlation of capacitance effects with stimulus, etc., and with the other electrical effects.

Other more specific objects and features of this invention will be apparent from the description to follow. Although measurements will usually be made on the skin, it will be understood that they may also be made on other forms of biological tissue. While particularly useful in measurements on living tissue, the invention may also be used to measure electrical effects as the tissue dies.

In general the present invention contemplates measuring the electrical response of biological tissue by applying an alternating current from a generator to the tissue via suitable contacting electrodes. The generator is designed to have an output impedance which is high compared to the tissue impedance, so that a substantially constant current flows through the tissue. A high input-impedance voltage sensitive device is provided to measure the A.C. (alternating current) voltage appearing between the electrodes. The A.-C. voltage amplitude represents an accurate measure of tissue resistance, due to the substantially constant A.-C. current flow. Tissue potential has substantially no effect on the amplitude of the alternating current that flows through the tissue. At the same time the application of a small alternating current to the tissue in no way alters the normal magnitude of the slowly varying D.-C. (direct-current) tissue potential. The latter may be measured along with the resistance, and in certain embodiments of the invention both measurements are made simultaneously. Since the A.-C. tissue IR drop alternately adds to or subtracts from the tissue potential, polarization effects are thereby minimized.

Although no measurable inductive effects have yet been found to be associated with living tissue, measurable capacitive effects have been found. The capacitance may be considered to be in parallel with the tissue resistance.

To measure tissue resistance accurately, the frequency of the alternating current supplied by the constant current generator is advantageously very low, so that the tissue impedance is substantially resistive, thereby substantially eliminating the effects of capacitance. At the same time, the frequency should be sufficiently high to follow changes in tissue resistance as they occur. An operating frequency of between five and ten cycles per second has been found to satisfy both of these requirements.

In order to determine the relationship of tissue capacitance to physiological and psychological changes in the body, it is desirable to have apparatus capable of measuring capacitance conveniently, and substantially independently of tissue potential and resistance. For such measurements, in accordance with the invention, a high-frequency alternating current from a constant current source is applied to the tissue electrodes, and the A.-C. response measured. Advantageously the frequency is sufficiently high so that the tissue impedance is predominantly capacitive. Frequencies above about 10 kc. (kilocycles per second), and preferably between 10 and 50 kc., are considered satisfactory.

In accordance with a further aspect of the invention, a square-wave constant-current generator is employed as the alternating current supply for measuring tissue resistance. This is believed helpful in reducing the effect of tissue capacitance on the measurement, for a given frequency of operation. For a direct reading meter, the A.-C. voltage drop developed across the tissue is converted to a corresponding D.-C. voltage by rectification. By virtue of the square-wave current employed, the amount of filtering of the rectified voltage may be appreciably reduced (for a given ripple factor), and hence the instrument response time is reduced.

A fuller understanding of the invention may be had from the following detailed description with reference to the drawings, in which:

FIG. 1 is a block diagram showing apparatus for measuring tissue electrical response in accordance with the present invention;

FIG. 2 is a graph showing the simultaneous recording of tissue resistance and tissue potential using the apparatus of FIG. 1;

FIG. 3 is a block diagram of apparatus for measuring simultaneously tissue resistance, tissue capacitance and tissue potential;

FIG. 4 is a block diagram of apparatus for measuring tissue resistance employing a calibrated D.-C. meter as an indicator device.

Figure 5:
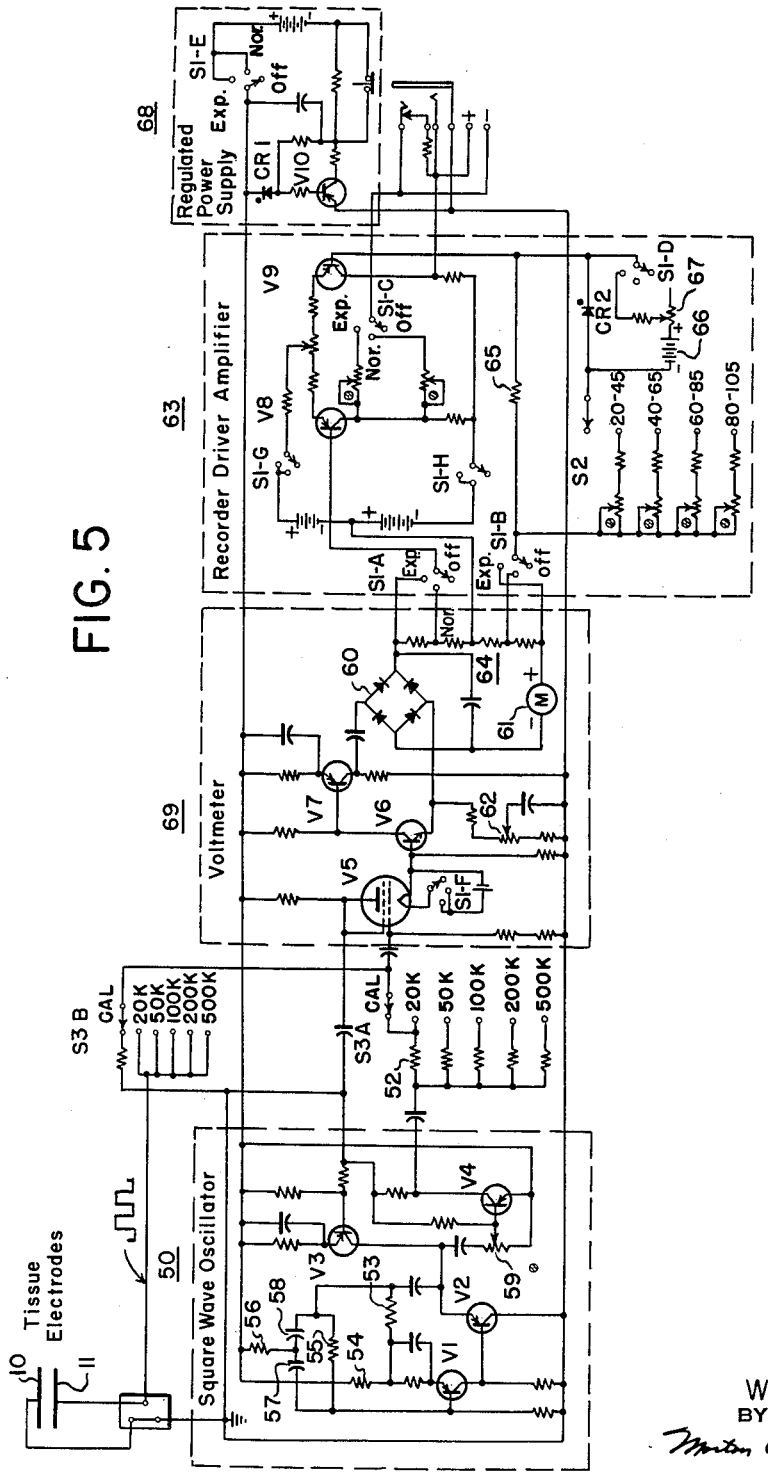
FIG. 5 is a schematic diagram of a transistorized tissue resistance meter in accordance with the teachings of this invention.

Referring to FIG. 1, an embodiment is shown capable of simultaneously recording tissue resistance and potential. A pair of contacting electrodes 10 and 11 are in contact with the skin of a subject, shown as wrist 12. Oscillator 13 is employed to supply an alternating current to the electrodes via conductors 14, 15. Resistor 16, connected in series with conductor 14 and the oscillator, has a high resistance value and serves to make the oscillator appear as a constant current source with respect to the tissue between the measuring electrodes. The resistance value is selected to be high compared to that of the tissue resistance to be measured, and a range of from 0.5 megohm to 10 megohms has been found suitable in practice.

Amplifier 17 is connected to the measuring electrodes as shown. The amplifier input impedance is advantageously very high compared to the tissue resistance, in order to minimize shunt loading around the tissue and thereby minimize errors in resistance measurement. An input impedance of the order of 50 megohms has been found desirable for accurately measuring tissue resistances up to 500K. Since in this embodiment both tissue potential and resistance are to be recorded, a D.-C. amplifier is employed.

Recorder 18 receives the output of amplifier 17, and is here shown as a D.-C. recorder so as to record both A.-C. and D.-C. components of the amplifier output as a function of time.

FIG. 2 is a Cartesian coordinate graphical recording made with the apparatus of FIG. 1, and shows a continuous recording from which skin potential and skin resistance can readily be determined. The amplitude of the low frequency A.-C. voltage 20 can readily be measured by reference to the coordinate lines of the graph paper. The D.C. component, proportional to skin potential, lies midway between the peaks of the A.-C. cycles as indicated by dotted line 21, and can also be measured by reference to the coordinate lines. With appropriate adjustment of amplification, the skin potential (E) and the amplitude of the A.-C. wave 20 in millivolts may be read directly from the graph.

With a constant A.-C. current to the tissue and a linear amplifier 17, the amplitude of A.-C. wave 20 is directly proportional to tissue resistance, in accordance with Ohm's law. Hence the tissue resistance (R) can be read directly from the graph by suitable calibration. In FIG. 2, the current was made one microampere peak-to-peak, so that the peak-to-peak value of wave 20 in millivolts gives the tissue resistance in kilohms. The legend above two selected points gives values of skin potential and tissue resistance as read from the graph at those points.

Specifically, at the point indicated by the arrow toward the left of the graph, the D.-C. component indicated by dotted line 21 reads −56 millivolts, and accordingly this is the skin potential. The peak-to-peak value of the A.-C. wave at this point is approximately 26 millivolts. Since the current is one microampere peak-to-peak, this corresponds to a skin resistance of 26 kilohms, as indicated. At the point indicated by the arrow near the center of the graph, a skin potential of −70 millivolts may be read at the dotted line 21, and the peak-to-peak voltage of about 11 millivolts indicates that the skin resistance is 11 kilohms.

Throughout the particular time interval shown the skin-potential remained negative. However, it should be noted that bioelectric potentials may also be of positive polarity. It should also be noted that the stimulus indicated on the graph produced simultaneously an increase in negative skin potential and a decrease in skin resistance. The merits of a single channel recording showing the simultaneous but independent histories of skin potential and skin resistance will be apparent to those skilled in the art.

If it is desired to measure tissue resistance only, amplifier 17 could be changed to an A.-C. amplifier with a low-frequency cutoff between the highest frequency normally encountered in tissue resistance measurements, say one cycle/second and the oscillaotr frequency. To facilitate filtering, the oscillator frequency may be selected somewhat above 10 cycles/second, say up to 20 cycles/second, without serious impairment of accuracy due to skin capacitance effects for many purposes.

FIG. 3 shows another embodiment of this invention capable of measuring skin capacitance, as well as resistance and potential. High-frequency oscillator 30 and low-frequency osilcator 13 are connected in parallel across the tissue measuring electrodes via resistors 32 and 16, respectively, selected to insure substantially constant current operation. The frequency $f_1$ of oscillator 30 is advantageously selected to be in the range where the capacitive current component in the tissue is large compared to the resistive current component, so that the tissue impedance is predominantly capacitive and the voltage across the electrodes is primarily that due to flow of current through the capacitive reactance. Frequencies in the range of 10 kc. to 50 kc. are ordinarily suitable. The frequency $f_2$ of oscillator 13 may be selected as in FIG. 1.

Amplifier 34, having a very high input impedance, is provided to amplify the high and low frequency A.-C. voltages developed across the measuring electrodes, as well as the D.-C. tissue potential. The output of amplifier 34 is connected as shown via high-pass filter 35 to recorder 36 and via low-pass filter 37 to recorder 18. Recorder 18 records simultaneously the low frequency A.-C. $f_2$ voltage proportional to skin resistance, and the D.-C. skin potential, as explained above in connection with FIGS. 1 and 2. Recorder 36 is provided to record only the high-frequency A.-C. voltage $f_1$. This voltage is substantially proportional to the tissue reactance, and hence inversely proportional to tissue capacitance.

FIG. 4 shows an embodiment employing a square-wave A.-C. excitation, and also arranged to indicate tissue resistance on a meter. A square-wave oscillator current supply 40 is shown connected to the tissue electrodes via high resistor 41, to produce constant current through the tissue. Amplifier 42 is an A.-C. coupled high-input impedance amplifier arranged to amplify the A.-C. voltage developed across the tissue being measured, but not the D.-C. tissue potential. Detector 43 is a rectifier for developing a D.-C. output voltage proportional to the A.-C. amplitude. The output is fed to meter 44, which is calibrated to read tissue resistance.

Oscillator 40 is advantageously operated at a low frequency (e.g. 5 to 10 c.p.s.) in order to eliminate loss in measuring response due to the tissue shunt capacitance. Using square-wave excitation instead of sinusoidal is also advantageous in reducing the effects of tissue capacitance since the voltage response to the applied current builds up to its final steady-state value more rapidly before the current is reversed at the end of each half-cycle. Square-wave excitation also greatly reduces the amount of filtering required to eliminate objectionable A.-C. ripple in the rectified signal fed to the indicating meter, and hence minimizes weight and cost of the apparatus and reduces the electrical response time of the rectifier and meter.

FIG. 5 shows a schematic diagram of a practical transistorized tissue resistance monitor following the general principles of FIG. 4. A square wave oscillator 50 provides current for the tissue electrodes 10, 11 via resistors 52 and ganged range selector switch sections S3A, S3B. Resistors 52 insure constant current operation and vary in magnitude from 400K for the 20K tissue resistance range to 10 megohms for the 500K range. Maximum tissue current is about 20 microamperes in the 20K range, and progressively decreases to less than one microampere in the 10 megohm range, well below the level of sensation.

Transistors V1, V2 and V3 are connected as an RC feedback oscillator. Positive feedback is provided through resistor 53 from the emitter of V2 to the emitter of V1. Negative feedback is provided from the emitter of V2 to the base of V1 through the null network consisting of resistors 55, 56 and capacitors 57, 58. At the null frequency the amount of negative feedback is sharply reduced and the loop gain becomes sufficient to cause oscillation. At all other frequencies the negative feedback predominates over the positive feedback, thereby precluding oscillation. Transistor V4 functions as an overdriven amplifier converting the oscillator sine wave input to the base thereof to a square wave output fed to resistors 52. Potentiometer 59 is provided to vary the operating point of V4 and hence change the duty cycle (over a limited range) of the square wave output. This permits adjusting the square-waves for symmetry. It may also be used to compensate for minor unbalance in the forward conducting resistances of the rectifier diodes to be described below.

The A.C. voltage developed across the tissue resistance between the contacting electrodes is capacitively coupled to the grid of cathode follower tube V5, which is used to provide an extremely high amplifier input impedance of approximately 50 megohms for voltmeter 69. The cathode (filament) of V5 is directly coupled to transistor V6 which is in turn D.-C. connected to V7, a transistor of opposite conductivity type, so as to form a cascade complementary direct-coupled voltage amplifier. The amplified voltage at the collector of V7 is connected to one A.-C. terminal of the full-wave bridge rectifier 60 and the other A.-C. terminal of the bridge is returned to the emitter of V6 to provide negative feedback thereto for gain stabilization. A D.-C. microammeter 61 is connected across the output terminals of the bridge rectifier and is calibrated directly in terms of the unknown tissue resistance by properly adjusting the amplifier gain control potentiometer 62.

An auxiliary recorder driver-amplifier is shown at 63 including transistors V8 and V9 which are connected as an emitter-coupled push-pull amplifier. The input voltage for the driver amplifier is developed across resistance network 64 connected in series with meter 61 as shown. The several sections of switch S1 (denoted A, B, etc.) provide normal or expanded operation of the recorder by selecting the proper multiplying resistors in the aforementioned resistor network. Switch S1 also has an "off" position.

Selection of the desired portion of the resistance range to be expanded is achieved by offsetting or bucking out the voltage developed across the meter resistance network at the low end of the particular expanded scale, thereby reducing the current in the external recorder circuit to zero at that point. The required bucking voltage is developed across resistor 65 by battery 66 which is voltage stabilized by regulator diode CR2. The magnitude of the series bucking voltage is established by the expanded-range selector switch S2 which is adapted to selectively switch any one of a plurality of current-limiting resistors in series with resistor 65 and battery 66. Resistor 67 is made variable to permit optimum adjustment of the regulator diode current as battery 66 ages, thus ensuring that the current supplied to resistor 65 remains constant throughout the life of the battery.

Operating voltage for the instrument is supplied by regulated power supply 68. Transistor V10 functions as a simple emitter-follower type voltage regulator for the battery supply, as shown, while regulator-diode CR1 stabilizes the base bias voltage supplied to the regulator transistor.

While several forms of the invention have been shown and described, many modifications therein will be obvious to those persons skilled in the art. Changes, therefore, in the construction and arrangement of this invention may be made without departing from its full scope as given by the appended claims.

I claim:

1. Apparatus for measuring electrical characteristics, including a component of tissue impedance, of biological tissue disposed between a pair of contacting electrodes which comprises an alternating current supply A.-C. coupled to said electrodes, said supply having an impedance which is high compared to the impedance of the tissue to be measured so as to pass a substantially constant amplitude alternating current therethrough which is substantially unaffected by changes in tissue impedance, said current being below the level of tissue response thereto, an amplifier for amplifying the alternating voltage developed between said electrodes, said amplifier having an input impedance which is high compared to the impedance of the tissue to be measured, and means for measuring the amplitude of said amplified alternating voltage to obtain a measurement of a component of tissue impedance.

2. Apparatus for measuring electrical characteristics, including a component of tissue impedance, of biological tissue disposed between a pair of contacting electrodes which comprises an alternating current supply A.-C. coupled to said electrodes, said supply having an impedance which is high compared to the impedance of the tissue to be measured so as to pass a substantially constant amplitude alternating current therethrough which is substantially unaffected by changes in tissue impedance, said current being below the level of tissue response thereto, an amplifier for amplifying the A.-C. and D.-C. voltages appearing between said electrodes, said amplifier having an input impedance which is high compared to the impedance of the tissue to be measured, and indicator means for displaying the respective amplitudes of said amplified A.-C. and D.-C. voltages to provide indications of a component of tissue impedance and of tissue potential.

3. Apparatus for measuring electrical characteristics, including a component of tissue impedance, of biological tissue disposed between a pair of contacting electrodes which comprises an alternating current supply A.-C. coupled to said electrodes, said supply having an impedance which is high compared to the impedance of the tissue to be measured so as to pass a substantially constant amplitude alternating current therethrough which is substantially unaffected by changes in tissue impedance, said current being below the level of tissue response thereto, an amplifier connected to amplify the A.-C. and D.-C. voltages appearing between said electrodes, said amplifier having an input impedance which is high compared to the impedance of the tissue to be measured, and a recorder for recording simultaneously the respective amplitudes of said amplified A.-C. and D.-C. voltages as a function of time to thereby provide indications of a component of tissue impedance and of tissue potential.

4. Apparatus for measuring the electrical resistance of biological tissue disposed between a pair of contacting electrodes which comprises a low frequency alternating current supply A.-C. coupled to said electrodes, said supply having an impedance which is high compared to the impedance of the tissue to be measured so as to pass a substantially constant amplitude alternating current therethrough which is substantially unaffected by changes in tissue impedance, said current being below the level of tissue response thereto, the frequency of said supply being sufficiently low so that the tissue impedance is substantially resistive, an amplifier for amplifying the alternating voltage developed between said electrodes, said amplifier having an input impedance which is high compared to the impedance of the tissue to be measured, and means for measuring the amplitude of said amplified alternating voltage to obtain a measurement of tissue resistance.

5. Apparatus in accordance with claim 4 in which the operating frequency is below about 20 cycles per second.

6. Apparatus in accordance with claim 4 in which the operating frequency is in the range of approximately 5 to 10 cycles per second.

7. Apparatus in accordance with claim 4 in which the alternating current is square-wave and substantially symmetrical.

8. Apparatus for measuring the electrical capacitance of biological tissue disposed between a pair of contacting electrodes which comprises a high frequency alternating current supply A.-C. coupled to said electrodes, said supply having an impedance which is high compared to the impedance of the tissue to be measured so as to pass a substantially constant amplitude alternating current therethrough which is substantially unaffected by changes in tissue impedance, said current being below the level of tissue response thereto, the frequency of said supply being sufficiently high so that the tissue impedance is predominantly capacitive, an amplifier for amplifying the alternating voltage developed between said electrodes, said amplifier having an input impedance which is high compared to the impedance of the tissue to be measured, and means for measuring the amplitude of said amplified alternating voltage to obtain a measurement of tissue capacitance.

9. Apparatus in accordance with claim 8 in which the operating frequency is above about 10 kilocycles per second.

10. Apparatus in accordance with claim 8 in which the operating frequency is in the range of approximately 10 to 50 kilocycles per second.

11. Apparatus for measuring the electrical resistance of biological tissue disposed between a pair of contacting electrodes which comprises a low frequency substantially symmetrical square-wave current supply A.-C. coupled to said electrodes, said supply having an impedance which is high compared to the impedance of the tissue to be measured so as to pass a substantially constant amplitude alternating current therethrough which is substantially unaffected by changes in tissue impedance, said current being below the level of tissue response thereto, the frequency of said supply being sufficiently low so that the tissue impedance is substantially resistive, an amplifier connected to amplify the A.-C. voltage developed between said electrodes, said amplifier having an input impedance which is high compared to the impedance of the tissue to be measured, rectifier means for converting said amplified A.-C. voltage to a corresponding D.-C. voltage, and indicator means for measuring said D.-C. voltage to yield an indication of tissue resistance.

12. Apparatus for measuring the electrical resistance and capacitance of biological tissue disposed between a pair of contacting electrodes which comprises low and high frequency alternating current sources A.-C. coupled to said electrodes, said sources having impedances which are high compared to the impedance of the tissue to be measured so as to pass therethrough substantially constant amplitude alternating currents at respective frequencies which are substantially unaffected by changes in tissue impedance, said currents being below the level of tissue response thereto, the frequencies of said sources being sufficiently low and high, respectively, so that the tissue impedance is predominantly resistive and predominantly capacitive at the respective frequencies, amplifying means having an input impedance which is high compared to the impedance of the tissue to be measured for amplifying the A.-C and D.-C. voltages appearing between said electrodes, means for separating the high frequency A.-C. voltage from the low frequency A.-C. and D.-C. voltages, means for measuring the amplitude of said amplified high frequency A.-C. voltage, and means for measuring the amplitude of said amplified low frequency A.-C. voltage and said amplified D.-C. voltage, whereby the resistance and capacitance of said tissue and the tissue potential may be measured.

References Cited in the file of this patent

UNITED STATES PATENTS

| | | |
|---|---|---|
| 1,888,139 | Nichols | Nov. 15, 1932 |
| 2,498,882 | Fizzell et al. | Feb. 28, 1950 |
| 2,771,554 | Gratzl | Nov. 20, 1956 |
| 2,944,542 | Barrett | July 12, 1960 |

OTHER REFERENCES

"Electrical Impedance of Nerve and Muscle," by Cole and Curtis, pages 73–87 of Cold Spring Harbor Symposium for 1936, vol. 4. Particular reference to pages 73–76.